(12) United States Patent
Mayerle et al.

(10) Patent No.: US 7,736,218 B2
(45) Date of Patent: Jun. 15, 2010

(54) STRAW CHOPPER AND SPREADER FOR A COMBINE HARVESTER WITH IMPROVED FIN DESIGN

(75) Inventors: Dean Mayerle, Saskatoon (CA); Leo Redekop, Saskatoon (CA)

(73) Assignee: Redekop Enterprises Inc., Saskatoon, Saskatchewan (CA)

( * ) Notice: Subject to any disclaimer, the term of this patent is extended or adjusted under 35 U.S.C. 154(b) by 468 days.

(21) Appl. No.: 11/671,607

(22) Filed: Feb. 6, 2007

(65) Prior Publication Data

US 2008/0188275 A1 Aug. 7, 2008

(51) Int. Cl.
*A01F 12/40* (2006.01)
(52) U.S. Cl. .................................................... 460/112
(58) Field of Classification Search ............... 460/111, 460/112, 8, 99, 901
See application file for complete search history.

(56) References Cited

U.S. PATENT DOCUMENTS

| 2,708,582 | A | * | 5/1955 | Adams .................... 239/650 |
| 3,350,017 | A | * | 10/1967 | Howell et al. ............. 239/660 |
| 3,383,844 | A | * | 5/1968 | Glass et al. ................ 56/14.4 |
| 3,721,073 | A | * | 3/1973 | Scarnato et al. .......... 56/16.4 B |
| 4,532,941 | A | * | 8/1985 | Gauthier .................... 460/112 |
| 4,892,504 | A | * | 1/1990 | Scott et al. ................. 460/112 |
| 5,351,468 | A | * | 10/1994 | Pominville ................... 56/192 |
| 5,421,777 | A | * | 6/1995 | Strubbe et al. .............. 460/13 |
| 5,797,793 | A | * | 8/1998 | Matousek et al. .......... 460/111 |
| 6,196,483 | B1 | * | 3/2001 | Jakobi ................. 241/101.763 |
| 6,694,715 | B2 | * | 2/2004 | Schoenherr ................. 56/192 |
| 6,736,721 | B2 | | 5/2004 | Niermann |
| 6,840,854 | B2 | | 1/2005 | Redekop |
| 6,939,221 | B1 | | 9/2005 | Redekop |
| 7,220,179 | B2 | * | 5/2007 | Redekop et al. ............ 460/112 |
| 7,261,633 | B2 | * | 8/2007 | Benes ....................... 460/111 |
| 2004/0127271 | A1 | | 7/2004 | Wolters |
| 2004/0221562 | A1 | * | 11/2004 | Snider ..................... 56/16.4 R |
| 2007/0066370 | A1 | * | 3/2007 | Redekop et al. ............ 460/112 |

FOREIGN PATENT DOCUMENTS

EP 1187526 3/2002

* cited by examiner

*Primary Examiner*—Robert E Pezzuto
*Assistant Examiner*—Mai T Nguyen
(74) *Attorney, Agent, or Firm*—Adrian D. Battison; Ade & Company Inc.

(57) ABSTRACT

A straw chopper is mounted at the rear hood of a combine harvester and includes a housing with a feed opening and a discharge opening and a rotor mounted in the housing comprising a hub with a plurality of blades mounted on the hub for chopping the fed materials and accelerating the chopped materials for discharge. A tailboard has a plurality of guide fins arranged relative to the housing so as to receive the chopped materials from the discharge opening to engage onto a guide surface and guide fins of the tailboard construction for spreading of the chopped materials to the sides. On each side of the tailboard an outermost one of the guide fins has a first fin portion extending downwardly from the bottom surface to an lowermost edge, a second fin portion inclined from the lowermost edge downwardly and toward the contact side of the fin and a third fin portion inclined from the second portion to the concave side and toward the bottom surface.

16 Claims, 5 Drawing Sheets

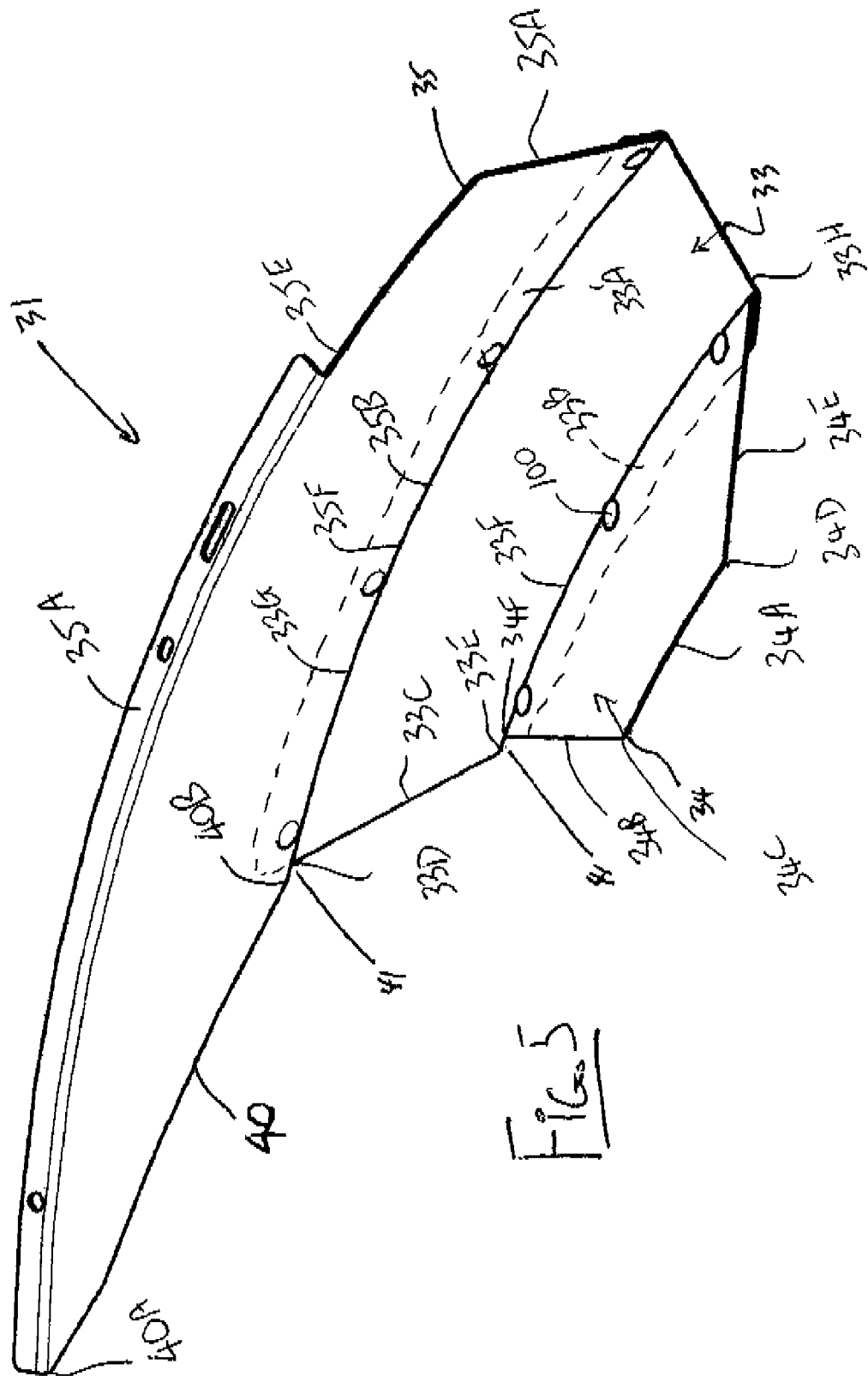

STRAW CHOPPER AND SPREADER FOR A COMBINE HARVESTER WITH IMPROVED FIN DESIGN

This invention relates to a straw chopper and spreader for a combine harvester with an improved fin design for guiding the crop material in the spreading action.

BACKGROUND OF THE INVENTION

In U.S. Pat. No. 6,840,854 (Redekop) issued Jan. 11, 2005 of the present Assignees is disclosed a straw chopper and discharge apparatus for a combine harvester where a rotor carrying a series of flail blades is mounted for rotation about a horizontal axis at the rear of the combine harvester so that the blades sweep around a housing of the apparatus to carry the straw and optionally the chaff from an inlet opening of the housing to a discharge opening of the housing. A tail board is provided at the discharge opening with a series of fins so that the material discharged from the opening at high speed engages onto the board and the fins thereon for spreading. This patent in particular provides an improved arrangement of the blades for generating a higher velocity in the air and material being discharged.

In U.S. Pat. No. 6,939,221 (Redekop et al) issued Sep. 6, 2005 also of the present Assignees is disclosed an arrangement of the tail board which is formed in two separate side by side sections allowing independent adjustment of the two sections for enhanced spreading action.

The disclosure of each of the above two patents of the present assignees is incorporated herein by reference.

One of the primary requirements of residue management systems are that they evenly distribute residue over a combine's entire cutting width. Often a straw chopper or spreading mechanism will be able to cover the cutting width of the combine, however equally important is the consistency of the spread.

Variables such as a field's terrain, cutting height and wind direction alter the final placement of the residue. The straight cut headers mounted on the front end of today's harvesters are increasing in width due to the release of larger and more powerful combines. Currently the largest straight cut headers are 45 feet wide and some operators utilize a pick-up header to gather in a swath that is cut from a pass as wide as 60 feet. Most farmers want the spread width of the residue to match of width of cut, while maintaining an even distribution across the field, regardless of the external variables that may affect it.

Current methods to maintain even distribution with a wide spread are limited to a 40 feet width. Uncontrollable variables such as the wind speed and direction can significantly reduce both the spread width and an even distribution.

Even using the significant improvements set out in the above patents some difficulties remain with the existing technology in that the current device has a reduced ability to significantly propel straw from a chopper against a strong wind. The current machine technology will only spread 10-12 feet against a 10 mph wind.

Other arrangements have been proposed to improve spreading in such conditions but these commonly suffer from a high level of complexity and horsepower usage in order to spread 15 feet against the wind. For example the following publications provide some attempts to improve the spreading action albeit with little success:

US Application 2004/0127271 of Wolters assigned to CNH provides a chaff and straw spreading impeller with flow guide fingers and a top and rear surface to guide the residue.

EP 1187526/WO 00/78126 of Schrattenecker shows a chopper with fans mounted to each end of the chopper shaft with nozzles adjustable to position the air velocity at different locations on the outer fins.

U.S. Pat. No. 6,736,721 of Niermann issued in 2004 and assigned to Claas discloses a very complex design which spreads better against the wind. A chopper cuts the straw then discharges the residue into a spreader which has movable guides to alter the placement in the field. Negatives include even distribution and very high horsepower requirements which can be as much as three times the horsepower of the chopper itself.

SUMMARY OF THE INVENTION

It is one object of the invention to provide an improved combine harvester and/or a chopper therefor which may provide an improved spreading action in windy conditions.

According to one aspect of the invention there is provided a guide assembly for use with a discharge apparatus of a combine harvester for receiving the materials to be spread from the combine harvester and for discharging the materials from the combine harvester where the apparatus comprises a housing having a feed opening into which the materials can be fed from the combine harvester; an assembly mounted in the housing for accelerating the materials for discharge; the housing having a discharge opening through which the materials are discharged;

the guide assembly comprising a plurality of guide surface portions arranged to be mounted relative to the housing so as to receive the materials from the discharge opening for spreading of the materials;

the guide assembly comprising a plurality of guide members each adjacent a respective one of the guide surfaces and each defining a guide member surface shaped along a direction of movement of the materials so as to define a contact side along which the materials flow to turn the materials from an initial discharge direction to a required discharge direction;

the guide member surface of at least one of the guide members having a first surface portion extending outwardly from the guide surface of the guide assembly to an outer edge and a second surface portion extending from the outer edge;

the second surface portion including at least a part which extends toward the guide surface and terminates in an edge spaced from the guide surface Preferably the part of the second surface portion is inclined toward the guide surface at an angle less than 90 degrees, that is it is not parallel to the guide member surface but inclined away from it. However the angle can vary and can approach the 90 degree angle parallel to the guide member surface for more close confinement of the material.

Preferably the second surface portion includes a first part attached to the outer edge of the first surface portion at an angle to the first surface portion and the part is defined by a second part of the second surface portion which is attached to an edge of the first part at an angle to the first part. Thus in the preferred arrangement there is an intervening surface which connects the guide member surface to the inwardly inclined part. However this is not essential and the part which is inclined inwardly may be directly connected to the outer edge or may be curved or dished to cup the material at the outer edge.

In this arrangement preferably the first part is inclined outwardly and to the contact side and second part is inclined inwardly and to the contact side. Preferably both surfaces are flat in cross section although of course both curve in the contact direction to follow the curvature of the guide member surface.

Preferably the outermost ones of the guide members on each side of the guide assembly is of the shape defined above.

Preferably the guide assembly is arranged such that the discharge opening discharges the material onto a first part of the guide assembly adjacent the housing and wherein each guide member extends from a leading end adjacent the first part to a trailing end and wherein the second surface portion of the guide member commences at a position spaced from the leading end.

Preferably the first surface portion has an inclined leading edge facing the material as it is discharged so as to define a leading end and a discharge end of the leading edge and wherein the second surface portion has a leading edge which has an end of the leading edge of the second surface portion at the leading edge of the first surface portion where the end is downstream of the discharge end so as to allow the material to escape from the leading edge of the first surface portion before encountering the leading edge of the second surface portion.

In most cases the guide assembly defined above is used with a chopping assembly which comprises a hub member mounted for rotation about a longitudinal axis of the hub member and a plurality of flail blade members mounted on the hub member for rotation therewith about said axis for chopping the fed materials and accelerating the chopped materials for discharge. However other forms of chopping may be used which may or may not include the air generation system for the spreading action. Also the guide assembly may be used with a chaff spreading system or other system which does not act to chop the material at the guide assembly.

Where the above type of chopping rotor is used, some of the blade members may comprise fan blades for generating an air stream and in a particularly preferred arrangement, as described in the above patent of the present assignee, two sets of fan blades can be located adjacent respective sides of the chopping assembly and wherein the outermost ones of the guide members on each side of the guide assembly each include a guide member surface having the first and second surface portions.

Preferably the outermost two of the guide members on each side of the guide assembly each include an outermost guide member surface for redirecting high velocity air into a tangential vector on the adjacent guide member having the first and second surface portions and wherein the outermost two on each side are connected by a transverse link for common side to side adjustment.

In accordance with a second aspect of the present invention there is provided a guide assembly comprising a plurality of guide surface portions arranged to be mounted relative to the housing so as to receive the materials from the discharge opening for spreading of the materials;

the guide assembly comprising a plurality of guide members each adjacent a respective one of the guide surfaces and each defining a guide member surface shaped along a direction of movement of the materials so as to define a contact side along which the materials flow to turn the materials from an initial discharge direction to a required discharge direction;

the guide member surface of at least one of the guide members having a first surface portion having an outer edge and a second surface portion extending from the outer edge;

wherein the first surface portion has an inclined leading edge facing the material as it is discharged so as to define a leading end and a discharge end of the leading edge and wherein the second surface portion has a leading edge which has an end of the leading edge of the second surface portion at the leading edge of the first surface portion where the end is downstream of the discharge end so as to allow the material to escape from the leading edge of the first surface portion before encountering the leading edge of the second surface portion.

It will be appreciated that in most commercial devices of this type, the guide assembly forms a tailboard projecting rearwardly from the chopper housing which has a bottom surface onto which the crop material is directed. On the bottom surface is a series of guide fins projecting downwardly from the bottom surface. However other arrangements of the guide surface and the guide members can be provided which do not form a common board and are not formed as metal plates or fins. Each guide surface thus may be formed with its associated guide members as elements separate form others so that is therefore in effect no common "board". The orientation of the guide surfaces is commonly rearward with spreading to each side but this arrangement is not essential and is based on use of a single transversely mounted chopping rotor. Other orientations of chopping device may require alternative arrangements of the guide surfaces which are contemplated within the present invention. As set out in the above patent of the present assignee, the tailboard may be formed in two or more parts for independent adjustment.

Where the arrangement is limited to the use of a tailboard and fins, the invention may provide a tailboard arranged to be mounted relative to the housing so as to receive the materials from the discharge opening to engage for spreading of the materials;

the tailboard defining a bottom surface facing downwardly against which the materials are directed from the discharge opening;

the tailboard defining a plurality of guide fins at spaced positions across the bottom surface extending generally downwardly from the bottom surface for engaging the materials in their movement;

the guide fins being shaped along a direction of movement of the materials so as to define a contact side along which the material flow to turn the materials from an initial rearward discharge direction toward a side of the tailboard;

on each side of the tailboard at least one of the guide fins having a first fin portion extending downwardly from the bottom surface to an lowermost edge, a second fin portion extending from the outer edge toward the contact side of the fin and a third fin portion extending from the second portion generally toward the bottom surface and terminates in an edge spaced from the bottom surface.

According to a fourth aspect of the invention there is provided a tailboard arranged relative to the housing so as to receive the chopped materials from the discharge opening to engage for spreading of the chopped materials;

the tailboard defining a bottom surface facing downwardly against which the materials are directed from the discharge opening;

the tailboard defining a plurality of guide fins at spaced positions across the bottom surface extending generally downwardly from the bottom surface for engaging the materials in their movement;

the guide fins being shaped along a direction of movement of the materials so as to define a contact side along which the material flow to turn the materials from an initial rearward discharge direction toward a side of the tailboard;

wherein one of the guide fins extends to a rear outer corner of the tailboard and wherein the tailboard includes an extension portion which extends from the tailboard rearwardly relative to a portion of the tailboard between the extension portions and outwardly to the side relative to portions of the tailboard in front of the extension portion.

The present invention has basic objectives which may be provided by the arrangements described in detail hereinafter:

A method to utilize the technology described in the above patents of the present assignee to perform better against a 10 mph headwind A simplified and cost reduced method to spread over 15 feet against a 10 mph headwind.

BRIEF DESCRIPTION OF THE DRAWINGS

One embodiment of the invention will now be described in conjunction with the accompanying drawings in which:

FIG. 5 is an isometric view from the bottom of one of the fins of the tailboard of FIG. 1.

In the drawings like characters of reference indicate corresponding parts in the different figures.

DETAILED DESCRIPTION

Figure 1:
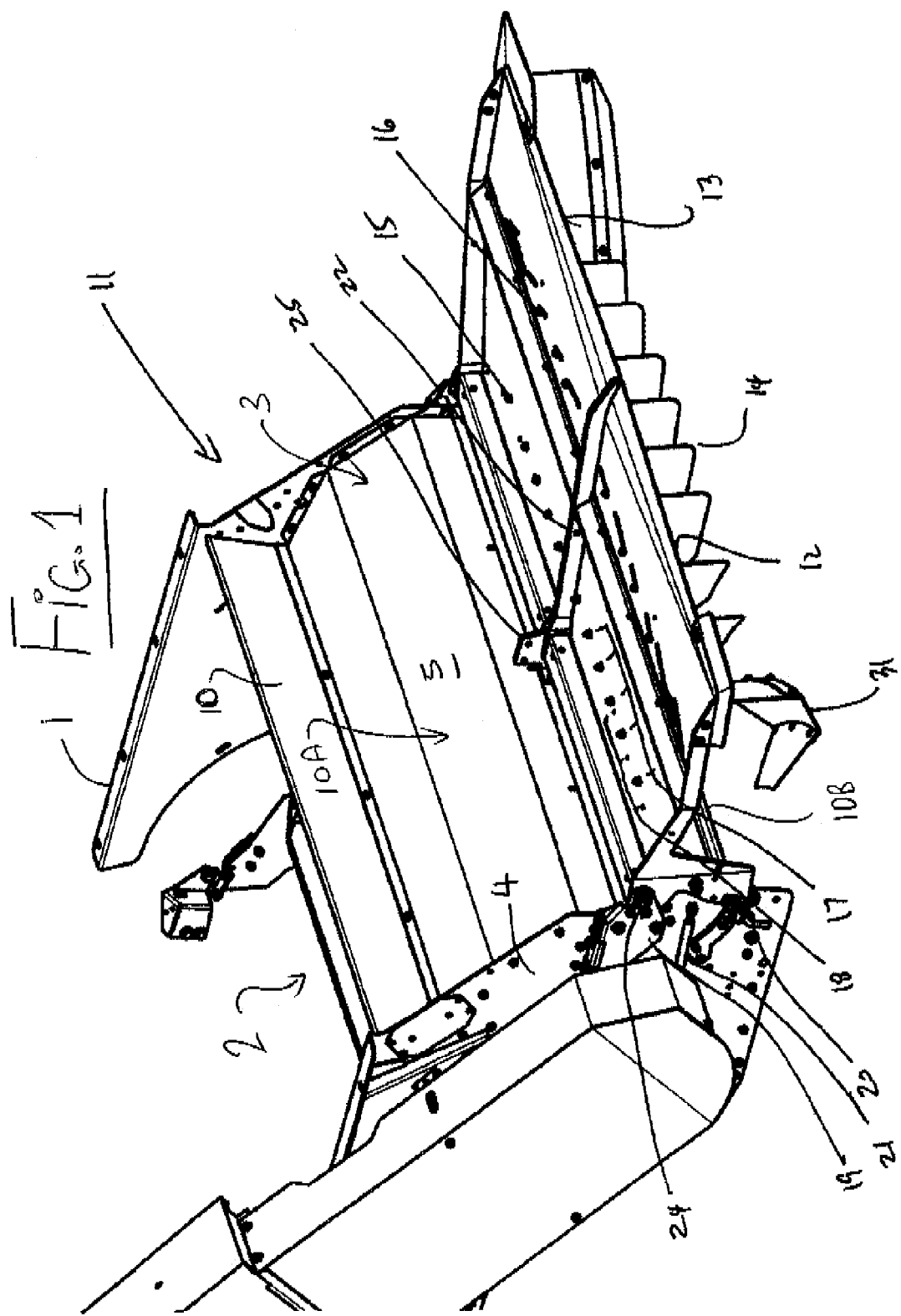
FIG. 1 is an isometric view of a rear section of a straw chopping and spreading arrangement for mounting on a combine harvester in accordance with the present invention.

A combine harvester is shown in FIG. 1 of the above mentioned U.S. Pat. No. 6,939,221 and comprises a combine harvester housing mounted on ground wheels for transport over a ground in conventional manner. The combine harvester is shown only schematically since many different designs are available and well known to one skilled in the art. The combine harvester includes a straw separation section and a sieve section. Again these elements are conventional and provide arrangements for separation of the straw from the crop material allowing the seed material to fall through to the sieve at which seeds are separated from the seed material leaving the chaff or other lighter materials on top of the sieve to be carried away from the sieve by an air flow through the sieve as is well known.

The rear of the combine is provided is a rear hood into which air from the straw separation system and the sieves enters and into which straw is discharged rearwardly for and is guided by guide wall and by an operable guide panel in the hood section into a chopper and spreader generally indicated at 11.

This arrangement is well known and commercial products are readily available from Redekop Manufacturing and other manufacturers of straw choppers of this type.

An example of a chopper of this type is disclosed in U.S. Pat. No. 6,478,674 issued Nov. 12, 2002, U.S. Pat. No. 5,482, 508 issued Jan. 9, 1996 and U.S. Pat. No. 5,232,405 issued Aug. 3, 1993 all of Leo Redekop, the disclosures of which are incorporated herein by reference.

The chopper has a horizontal upper mounting flange 1 which attaches to a corresponding bottom flange of the hood of the combine. This forms a rectangular open mouth at the top of the chopper which corresponds in shape to the rectangular lower opening of the hood so that all material discharging from the guide walls falls into the upper part of the housing and enters the inlet 2 of the chopper.

The chopper comprises a housing 3 attached to the top mounting flange and depending therefrom and defined by side walls 4 at opposite sides of the hood and generally co-planar therewith. Bridging the side walls 4 is provided a bottom wall 5 and a top wall 6 which extend across the width of the chopper and form a generally cylindrical containing surface for receiving the chopper rotor 7. The rotor 7 includes a hub 8 with a plurality of radially extending flails or blades 9 carried on the rotor for rotation therewith around the axis of the rotor which is arranged across the width of the chopper.

Many different arrangements and construction of blade can be used as are well known to one skilled in the art and described in the above patents of Redekop. In most cases the chopper includes stationary blades mounted on the bottom wall 6 at a position partway around the bottom wall. The stationary blades are arranged in a row at spaced positions across the width of the chopper so as to co-operate with the rotating blades of the hub in a chopping action. The spacing between the blades can be selected in accordance with the type of rotating blades as is well known to one skilled in the art.

The top wall 5 and the bottom wall 6 define at the upper part of the housing the inlet 2 into which the straw can be guided from the hood. The chaff may be carried from the end of the sieve over the space between the end of the sieve and the front edge of the bottom wall 6 so as to carry the chaff in the air stream from the sieve over the plate and into the opening 2.

The top wall 5 includes a generally vertical portion 10 which extends 5 downwardly from the top flange 1 to the top of the rotor. The top wall 5 further includes a curved section 10A which extends around the top of the rotor to a rear edge 10B which defines the top edge of the rear discharge opening 10C through which the material exits in the stream of air and chopped materials generated by the rotation of the rotor within the housing.

The chopper has been configured with a left 12 and a right 13 tailboard as known in U.S. Pat. No. 6,939,221. Each tailboard incorporates six fins 14 that pivot about front mounting holes 15 and can slide along a back slot 16 to a required location where it is fixed by a locating screw. This tailboard has two locations for a leading edge thus defining a first leading edge fin placement 17 and a second placement 18 for cooperation with the common rear slots 16. The first fin placement 17 is used for a high air velocity rotor and optimizes the product spread on a wide spread pattern. The second placement pattern 18 is utilized with a traditional rotor most often used with narrow spread aggressive cutting chopper having low air velocities.

As shown in more detail in the above U.S. Pat. No. 6,939, 221, the left and right tailboards are mounted to the straw chopper 11 with side mount plates 19. The tailboard's angular positioned is fixed with a spring-loaded pin 20 in a slot on each side of the combine. A gas spring 21 on each side of the housing counter balances the weight of the tailboard allowing the operator to easily adjust each of the tailboards positions.

The tailboards pivot on a common axis. The axis is defined by the pivot 24 in each side plate and the center pivot 25. Once each assembly is attached to the chopper each tailboard is fully adjustable independent of each other.

The present invention is primarily concerned with the construction and arrangement of the fins of the tailboard 13, 14. It will be appreciated that a common tailboard can also be used in this current arrangement.

As is well known conventional fins or guide members are arranged with a leading edge adjacent the front of the tailboard so that the crop engaging onto the main surface of the tailboard also engages the side surfaces or guide surfaces of the fins adjacent the leading edge. The fins each extend rearwardly from the leading edge to a trailing edge adjacent the rear edge of the tailboard. Each of the fins has a shape which is preferably generally curved so as to define a contact side which is the concave side of the fin with the curvature carrying the fin toward the side edge of the tailboard. Flat fins can also be used so that the contact side is flat. Thus the crop material is carried by the fins as the crop material moves rearwardly of the tailboard on the inside surface of the concave fin so that the material is moved outwardly to be discharged in a spread pattern rearwardly and to the sides of the tailboard. The tailboard thus defines a series of guide surface portions between the fins with each fin acting as a guide member relative to the respective guide surface portion.

Figure 4:
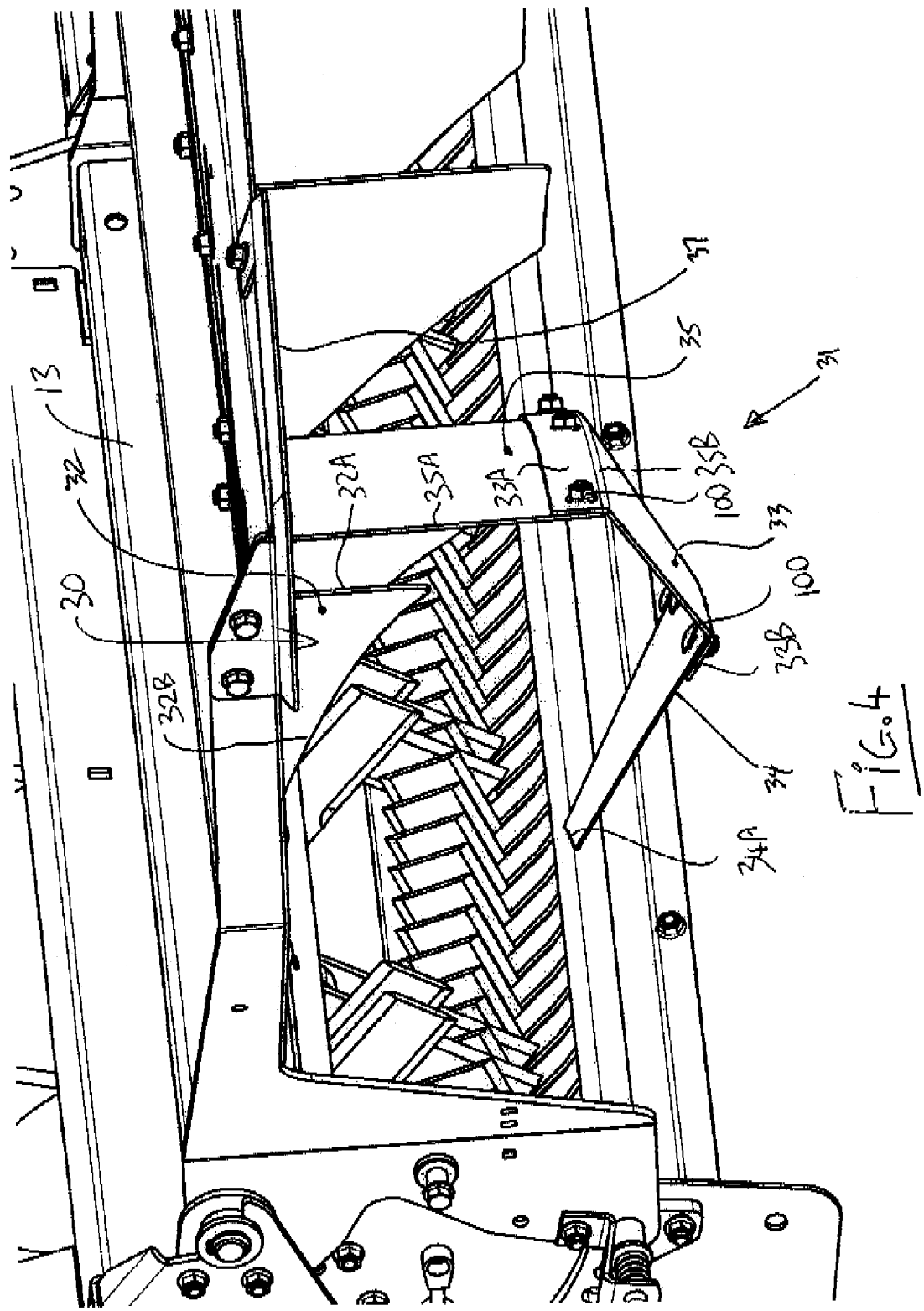
FIG. 4 is an isometric view of tailboard of FIG. 1 from the rear corner showing the construction of the outermost guide fin.

In the present arrangement, the outermost pair of fins are modified so as to provide an additional more complex structure and arrangement of the fins. Thus referring to FIGS. 4 and 5, the outermost pair of fins indicated at 30 define a first fin which is indicated at 32 and extends from a leading edge at or adjacent the front edge of the tailboard 13 to a trailing edge 32A rearward of the leading edge but forward of the rear edge of the tailboard. The fin includes an inclined lower surface 32B so that the fin commences at zero height and gradually increases in height to the trailing edge 32A. In this way any crop material engaging the lower edge 32B can slide off that edge as the crop material moves rearwardly in the airstream.

The next adjacent fin is modified to include a second part generally indicated at 31. This fin part 31 is made up of three sheets 33, 34 and 35 where the first sheet 35 forms the main body of the fin and the sheets 33 and 34 form a first part and second part attached to the main body of the fin and defining a generally channel shaped portion best shown in FIG. 4.

The sheet 35 as shown in FIG. 5 has a top flange 35A at the top edge for bolting to the underside of the tailboard at the guide surface portion of the tailboard using the mountings previously described. The sheet 35 when mounted by the flange 35A extends at right angles to the surface of the tailboard. The sheet or main body 35 of the fin extends from a leading edge 40 rearwardly of the tailboard to a trailing edge 35A located at the rear of the tailboard adjacent one side. The sheet 35 has a bottom edge 35B which is parallel to the flange 35A and the top edge of the sheet 35. The leading edge 40 commences at a front end 40A and extends rearwardly while increasing in height to a trailing end 40B of the leading edge 40. Again the inclined leading edge 40 commencing at zero height allows the crop material to slide over this leading edge to be released from the fin should any crop material be trapped around that leading edge. Thus some of the crop slides along the sheet 35 along the concave side so as to be guided thereby in the spreading action.

At the bottom edge 35B of the sheet 35 is attached the second sheet 33. The sheet 33 has two mounting flanges at its side edges including a first mounting flange 33A and a second mounting flange 33B. The mounting flange 33A is arranged to lie along the outside surface of the sheet 35 at the lower edge 35B so as to be bolted thereto by attachment bolts 100. The flange 33A is arranged at an angle to the main body of the sheet 33 so that the sheet 33 is inclined from the lower edge 35B in a direction downwardly from the lower edge and to the side of the sheet 35 which is the concave side.

The angle of the sheet 33 to the sheet 35 is of the order of 120° but the angle can vary between 90° and approximately 150°.

The sheet 34 is attached to the flange 33B at the outer edge of the sheet 33 by further bolts 100. The sheet 34 is arranged at an angle again of the order of 120° to the sheet 33. Thus the sheet 34 is inclined upwardly from the lower edge of the sheet 33 to an upper edge 34A of the sheet 34. As shown in FIG. 5, each of the sheets 33, 34 and 35 is curved in bottom plan view so that the adjoining edges at the side edges of the sheet 33 are also curved. The width of the sheet 33 is substantially constant along its length so that the sheets 34 are equidistantly spaced along its length from the sheet 35. In cross section the sheets are flat so as to define a channel member with the sheet 33 at the base and the sheets 34 and 35 upstanding from that base and with the angle between the sheets of the order of 120° as previously stated. The sheet 35 is directly attached to the underside of the tail board so as to extend at right angles to that surface. Thus the sheet 34 is inclined toward the surface of the tail board. However the upper edge 34A of the sheet 34 is spaced downwardly from the surface of the tailboard so as to allow any crop material to enter the space therebetween to be channeled by the curved fin defined by these three sheets including the main body 35 and the two additions sheets 33 and 34.

As previously stated the sheet 35 has a leading edge 40 extending from the end 40A to the end 40B. The sheet 33 has a leading edge 33C extending from an end 33D to a lower end 33E. Again the edge 33C is inclined rearwardly. The sheet 33 thus has an outer edge 33F which is considerably shorter than the inner edge 33G which is in turn considerably shorter than the edge 35E of the sheet 35. Similarly the sheet 34 has a leading edge 34B which is inclined rearwardly so that the outer most edge 34A of the sheet 34 extends from an end 34C to a rear end 34D and this is again shorter than the outer edge of the sheet 33 by a considerable distance. The sheet 34 also has a trailing edge 34E which is recessed from a trailing edge 33H of the sheet 33. Thus the leading edge 34B and the trailing edge 34E of the sheet 34 are tapered toward the outer edge 34A. However the sheet 34A acts to confine air and flowing materials into the channel which is defined on the concave side of the sheet 35.

Referring again to FIG. 5, the leading edge 40 of the sheet 35 terminates at the point 40B where it joins the outer edge of the sheet 35 which is indicated at 35F. The leading edge 33C has its inner end 33D spaced rearwardly from the end 40B of the leading edge 40. This forms a recessed portion 41 ensuring that any crop material flowing over the leading 40 is released from the leading edge 40 before it engages the leading edge 33C. This ensures that there is no shoulder or notch against which the crop material can engage to inhibit the free flow of the material over this edge. It will be appreciated that some crop material may fold over the leading edge in its movement rearwardly from the discharge opening onto the tailboard surface. It is necessary or highly desirable to ensure that the crop material is prevented from hanging up and hence the recess 41 at the junction between the outer edges of the sheet 35 and the sheet 33 and a similar recess 41 at the junction between the sheets 33 and the sheet 34 ensures that no such hang-up can occur. Thus similarly the end 34F of the leading edge 34B of the sheet 34 is recessed from the end 33E from the leading edge 33C of the sheet 33 by the recess portion indicated at 41.

Figure 2:
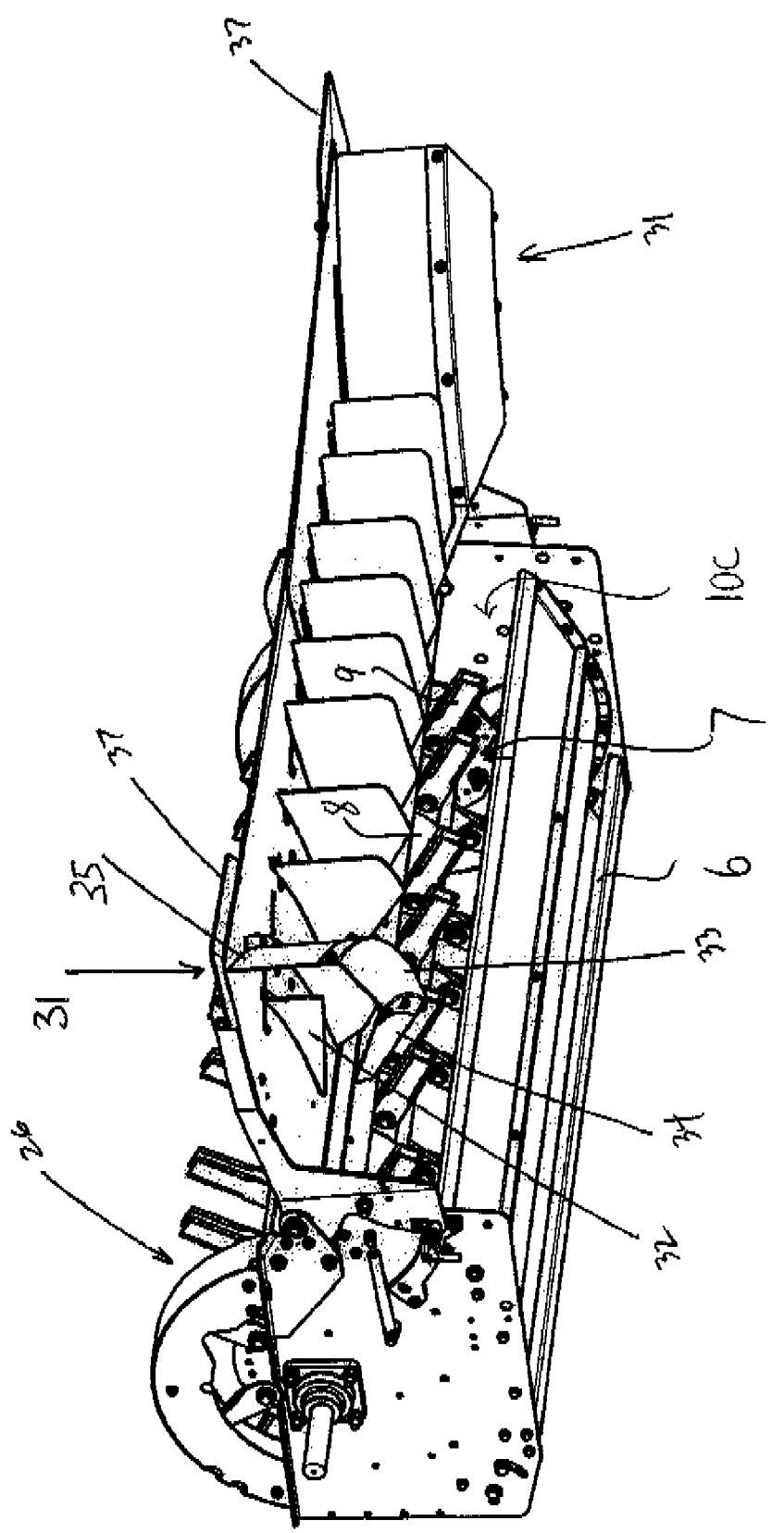
FIG. 2 is an isometric view of the components of FIG. 1 from the same side and below.
Figure 3:
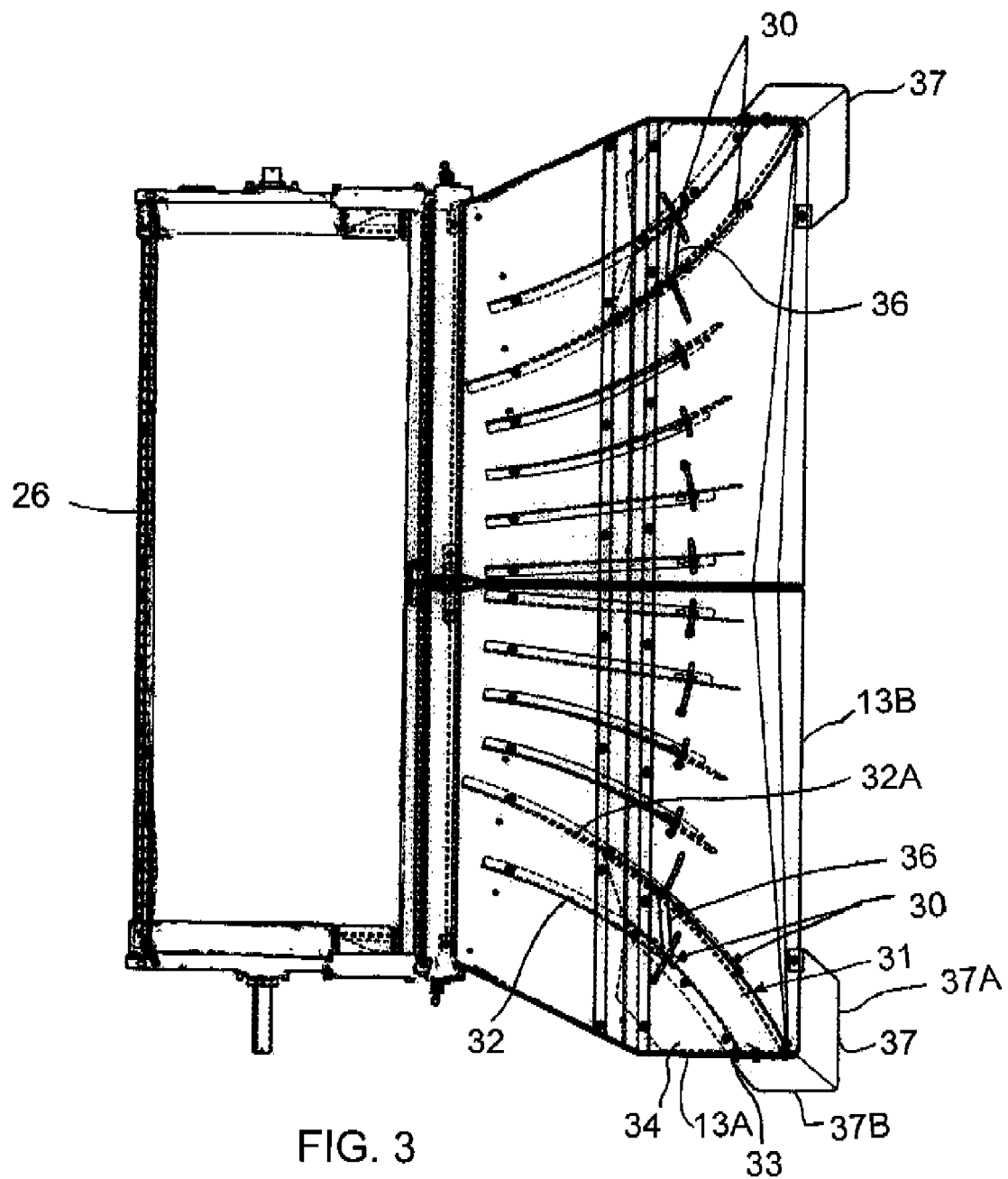
FIG. 3 is a top plan view of the components of FIG. 1 showing the guide fins in phantom.

Turning now to FIG. 3, the tailboard is shown in top plan view showing in phantom the outermost fin group 30 which includes the outermost fin 32 and the channel-shaped fin 31. These two fins are separate from one another and adjustably mounted on the tailboard. Each fin is mounted and pivots about a front mounting hole. Thus both fin 31 and 32 can be adjusted as previously described so that its forward end forms a pivot and its rearward end can be moved side to side in slots 16 (FIG. 2). A link 36 visible in FIG. 3 connects the fin 32 to the next fin 31 so that these fins are adjustable in common movement. The link 36 however only connects the outermost fin 32 to the next adjacent fin 31 and there is no further linkage to any of the remaining fins. The linkage 36 is merely a simple connection with no ability to effect adjustment of any of the fins except to control the common movement between the two fins 32 and 31.

A further modification to the tailboard comprises an extension portion 37 which is mounted on the tailboard at the corner between the side edge indicated at 13A and the rear edge indicated at 13B. The extension portion 37 is a plate formed in a common plane with the bottom surface of the tailboard so that the surface of the tailboard is extended outwardly beyond the rear edge 13B into the extension portion 37 and similarly the tailboard is extended beyond the side edge 13A into the extension portion 37. The extension 37 is a plate that is made of two main planes. The side plane is 3 degrees sloping downwards to the side of the tailboard, the rear surface is 3 degrees downwards from the rear tailboard edge. The purpose is to put a slight downward change to the trajectory of the residue stream after it has left the fin. This keeps the dust down and the residue from swirling up near the combine.

The extension portion 37 has a rear edge 37A and a side edge 37B. The side edge 37B thus projects outwardly from the side edge 13A and the rear edge 37A projects outwardly from the rear edge 13B with the rear edge 13B with the rear edge 13B extending across between the two extension portions 37 as best shown in FIG. 3. The side edge 37B is generally parallel to the side edge 37A and symmetrically the rear edge 37A is parallel to the rear edge 13B. The extension portion extends only over a small part of the tailboard at the corner for co-operation with the channel shaped fin portion 31 underlying that extension portion 37.

Thus the outer two most fins 30 on each side of the tailboard assemblies are configured to focus the high velocity air stream generated by the fan end rotor 26 on the chopped residue. The acceleration of the residue provides a wide spread under adverse side wind conditions. The outer two fins consist of the large fin 31 that carries and directs most of the residue and the smaller fin 32 that alters the direction of the high velocity air to provide a tangential thrust on the larger fin and greater residue acceleration.

The outermost small fin 32 on the tailboard is used to redirect the highest velocity air into a tangential vector with the rear end of next adjacent or second large fin 31. This provides the greatest acceleration of material and the most efficient use of the force available with the high velocity air. If the small fin 32 was removed the high velocity air would crash into fin 31 and bounce off of the fin taking material with it, most likely landing beside the chopper. The intention is to slowly turn the high velocity air and apply its energy to the residue. Surfaces 34 and 35 are attached to fin 31 so that the air, that is reflected off of the residue when being accelerated, is held captive and can not bounce off in another direction. More of the energy in the air is used to accelerate the residue than without these surfaces present. Adding surface 34 has a huge impact on the retained air velocities. In the field, removal of the surface 34 reduces the spread width by 25% (10 feet).

The residue primarily travels on the vertical fin surface 35, however conditions exist with tough, green straw where the residue discharged from the chopper does not flow easily and will contact the other surfaces. Surfaces 33 and 34 serve to contain and focus the air on the residue stream. Outer surface 34 is primarily used to contain the air that is being reflected from surfaces 35 and 33. The small fin 32 is positioned to direct the high velocity air tangentially on to the rear end of fin surface 35 of large fin 31. The relative position of the two fins 31 and 32 is maintained in an optimum tangential relationship with link 36. Adjustment of the two fins is available without the need to tune the relative fin positioning.

The large fin 31 is constructed so that plugging is minimized. In tough field conditions heavy, wet residue is discharged down the leading edge 40 of fin surface 35. Each adjoining surface must start approximately ½" behind the previous surface, as indicated at 41. This enables any residue traveling down the leading edge to clear the next surface, and therefore avoids plugging situations. The fin 32 has a passive leading edge since high velocity air must be able to pass by all surfaces, keeping the tough sticky residue moving.

The tailboard extensions 37 are added to the outer ends of the tailboard. The extensions serve to gradually change the direction of the high velocity residue stream while maintaining the momentum developed by the fins. It has been discovered that with the high velocity tailboard fin arrangement we are able to accelerate the residue to much greater levels and are therefore able to move it much more effectively against a stronger headwind. This also helps to keep the dust, generated when the flow stream slows and becomes turbulent, much further away from the combine.

A number of alternate embodiments and potential improvements are contemplated herein as follows:

Chaff spreaders—the method to channel air velocity and keep it from bouncing off of the accelerating residue.

The tailboard with the fin arrangement does not necessarily need to be attached to a chopper housing it could be attached to the rear hood of the combine harvester with an internal chopper of the combine harvester providing the air velocity.

A fan with a nozzle directed at the outer fins with the above mentioned geometry Since various modifications can be made in my invention as herein above described, and many apparently widely different embodiments of same made within the spirit and scope of the Claims without department from such spirit and scope, it is intended that all matter contained in the accompanying specification shall be interpreted as illustrative only and not in a limiting sense.

The invention claimed is:

1. A discharge apparatus for a combine harvester for receiving the materials to be spread from the combine harvester and for discharging the materials from the combine harvester, the discharge apparatus comprising:

a housing having a feed opening into which the materials are fed from the combine harvester;

an assembly mounted in the housing for accelerating the materials for discharge;

the housing having a discharge opening through which the materials are discharged;

and a guide assembly for guiding the discharged materials for spreading;

the guide assembly comprising a plurality of guide surface portions arranged to relative to the housing so as to receive thereon the materials from the discharge opening discharging from the discharge opening in an initial generally outward direction from the combine harvester for spreading of the materials;

the guide assembly comprising a plurality of guide members each located adjacent a respective one of the guide surface portions;

each guide member having a first edge in contact with the respective guide surface portion and a remote edge spaced from the respective guide surface portion;

each guide member having a contact surface extending between the first edge thereof and the remote edge thereof for engaging the materials in their movement on the respective guide surface portion;

at least some of the guide members being shaped and arranged such that the contact surface thereof contacts the materials engaging the respective guide surface portion and causes those materials to turn from the initial generally outward discharge direction from the combine harvester to a spreading direction at an angle to the initial direction;

the contact surface of at least one of the guide members having:

a first surface portion extending downwardly from the first edge at the guide surface portion to an outermost edge of the first surface portion spaced from the guide surface portion;

a second surface portion extending from the outermost edge of the first surface portion to an outer edge of the second surface portion;

and a third surface portion extending from the outer edge of the second surface portion to said remote edge of the contact surface;

said second surface portion extending from the lowermost edge of the first surface portion in a direction toward said spreading direction;

said third surface portion extending from the outer edge of the second surface portion in a direction generally toward said spreading direction and generally toward the guide surface portion, such that the remote edge is spaced from the guide surface portion and the remote edge is spaced from the first edge toward said spreading direction.

2. The discharge apparatus according to claim 1 wherein the second surface portion is inclined toward the guide surface at an angle less than 90 degrees.

3. The discharge apparatus according to claim 1 wherein the second surface portion includes a first part attached to said outer edge of the first surface portion at an angle to the first surface portion and said part is defined by a second part of the second surface portion which is attached to an edge of the first part at an angle to the first part.

4. The discharge apparatus according to claim 1 wherein the guide assembly is arranged such that the discharge opening discharges the material onto a first part of the guide assembly adjacent the housing and wherein each guide member extends from a leading end adjacent the first part to a trailing end and wherein the second surface portion of the guide member commences at a position spaced from the leading end.

5. The discharge apparatus according to claim 1 wherein the first surface portion has an inclined leading edge facing the material as it is discharged so as to define a leading end and a discharge end of the leading edge and wherein the second surface portion has a leading edge which has an end of the leading edge of the second surface portion at the leading edge of the first surface portion where the end is downstream of the discharge end so as to allow the material to escape from the leading edge of the first surface portion before encountering the leading edge of the second surface portion.

6. The discharge apparatus according to claim 1 wherein the assembly comprises a hub member mounted for rotation about a longitudinal axis of the hub member and a plurality of flail blade members mounted on the hub member for rotation therewith about said axis for chopping the fed materials and accelerating the chopped materials for discharge.

7. The discharge apparatus according to claim 6 wherein some of the blade members comprise fan blades for generating an air stream.

8. The discharge apparatus according to claim 6 wherein the blade members include two sets of fan blades which are located adjacent respective sides of the chopping assembly and wherein the outermost ones of the guide members on each side of the guide assembly each include a guide member surface having the first and second surface portions.

9. The discharge apparatus according to claim 1 wherein the outermost two of the guide members on each side of the guide assembly are connected by a transverse link for common side to side adjustment.

10. A tailboard assembly for use with a discharge apparatus of a combine harvester for receiving the materials to be spread from the combine harvester and for discharging the materials from the combine harvester where the discharge apparatus comprises a housing having a feed opening into which the materials can be fed from the combine harvester; an assembly mounted in the housing for accelerating the materials for discharge; the housing having a discharge opening through which the materials are discharged;

the tailboard assembly comprising a tailboard shaped and arranged to be mounted at the discharge opening so as to extend rearwardly from the discharge opening and so as to receive the materials discharging from the discharge opening in an initial generally rearward direction;

the tailboard defining a bottom surface facing downwardly against which the materials are directed from the discharge opening;

the tailboard assembly defining a plurality of guide fins at spaced positions in a row across the bottom surface of the tailboard extending generally downwardly from the bottom surface;

each guide fin having an upper edge in contact with the bottom surface of the tailboard and a remote edge spaced from the bottom surface;

each guide fin having a contact surface on one side of the guide fin between the upper edge thereof and the remote edge thereof for engaging the materials in their movement;

at least some of the guide fins being shaped and arranged on the tailboard such that the contact surface thereof contacts the materials engaging the bottom surface of the tailboard and causes those materials to turn from the initial generally rearward discharge direction from the combine harvester toward a side of the combine harvester;

the guide fins including on each respective side of the tailboard a selected guide fin of the guide fins;

each of the selected guide fins having:

a first fin portion extending downwardly from the upper edge at the bottom surface to a an lowermost edge of the first fin portion spaced from the bottom surface;

a second fin portion extending from the lowermost edge of the first fin portion to an outer edge of the second fin portion;

and a third fin portion extending from the outer edge of the second fin portion to said remote edge of the selected guide fin;

said second fin portion extending from the lowermost edge of the first fin portion in a direction toward the respective side of the tailboard;

said third fin portion extending from the outer edge of the second fin portion in a direction generally toward the side of the tailboard and generally toward the bottom surface, such that the remote edge is spaced from the bottom surface of the tailboard and the remote edge is spaced from the upper edge toward the side of the tailboard.

11. The tailboard assembly according to claim 10 wherein there is provided at each respective side of the tailboard an additional guide fin of the plurality of guide fins which is outward of said selected guide fin.

12. The tailboard assembly according to claim 10 wherein the first, second and third fin portions define surfaces which are inclined relative to one another at an angle.

13. The tailboard assembly according to claim 10 wherein the tailboard is arranged to be mounted such that the discharge opening discharges the material onto a first part of the tailboard adjacent the housing and wherein each selected guide fin extends from a leading end adjacent the first part to a trailing end and wherein the second fin portion of the selected guide fin commences at a position spaced from the leading end.

14. The tailboard assembly according to claim 10 wherein the first fin portion has an inclined leading edge facing the material as it is discharged so as to define a leading end and a discharge end of the leading edge and wherein the second fin portion has a leading edge which has an end of the leading edge of the second fin portion at the leading edge of the first fin portion where the end is downstream of the discharge end so as to allow the material to escape from the leading edge of the first fin portion before encountering the leading edge of the second fin portion.

15. The tailboard assembly according to claim 10 wherein each of said selected guide fins extends to a rear trailing edge thereof and wherein the tailboard includes an extension portion thereof which extends beyond the rear trailing edge toward the side and rear of the trailing edge.

16. The tailboard assembly according to claim 15 wherein the extension portion is inclined downwardly and outward relative to the bottom surface of the tailboard.

* * * * *